United States Patent
Yin et al.

(10) Patent No.: US 10,031,367 B2
(45) Date of Patent: Jul. 24, 2018

(54) DISPLAY WITH INVERTED THIN-FILM-TRANSISTOR LAYER

(71) Applicant: Apple Inc., Cupertino, CA (US)

(72) Inventors: Victor H. Yin, Cupertino, CA (US); Jun Qi, Cupertino, CA (US); Dinesh C. Mathew, Fremont, CA (US); Shih-Chang Chang, Cupertino, CA (US); Cheng Chen, San Jose, CA (US); John Z. Zhong, Cupertino, CA (US); Wei Chen, Palo Alto, CA (US); Adam T. Garelli, Santa Clara, CA (US); Bryan W. Posner, La Selva Beach, CA (US); Christiaan A. Ligtenberg, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 35 days.

(21) Appl. No.: 13/628,811

(22) Filed: Sep. 27, 2012

(65) Prior Publication Data

US 2014/0085556 A1    Mar. 27, 2014

(51) Int. Cl.
  *G02F 1/1335*    (2006.01)
  *G02F 1/1362*    (2006.01)
  (Continued)

(52) U.S. Cl.
  CPC ...... *G02F 1/133528* (2013.01); *G02F 1/1362* (2013.01); *G02F 1/13454* (2013.01);
  (Continued)

(58) Field of Classification Search
  CPC .......................... G02F 1/1368; G02F 1/136209
  (Continued)

(56) References Cited

U.S. PATENT DOCUMENTS 5,965,916 A    10/1999 Chen
6,008,872 A    12/1999 den Boer et al.
(Continued)

FOREIGN PATENT DOCUMENTS

CN    1982982    6/2007
EP    1826603    8/2007
(Continued)

OTHER PUBLICATIONS

German Office Action dated Nov. 5, 2014, DE 112013001588.9, 11 pages.

(Continued)

*Primary Examiner* — Michael Caley
*Assistant Examiner* — Agnes Dobrowolski
(74) *Attorney, Agent, or Firm* — Treyz Law Group, P.C.; G. Victor Treyz; Zachary D. Hadd (57) ABSTRACT

An electronic device may be provided with a display that has a layer of liquid crystal material interposed between a color filter layer and a thin-film-transistor layer. The thin-film-transistor layer may have a substrate with an upper surface and a lower surface. A circular polarizer may be formed on the upper surface. Thin-film transistor circuitry such as gate driver circuitry may be formed on the lower surface. A display driver circuit may be mounted on an inactive border region of the lower surface of the thin-film transistor substrate. Display pixels may form an array in a central active region of the display. A grid of metal gate and data lines may distribute signals from the display driver circuit and gate driver circuitry to the display pixels. A grid of non-reflecting lines may be interposed between the grid of metal lines and the lower surface.

25 Claims, 8 Drawing Sheets (51) Int. Cl.
*G02F 1/1345* (2006.01)
*G02F 1/1333* (2006.01)

(52) U.S. Cl.
CPC .................. *G02F 1/136209* (2013.01); *G02F 2001/133388* (2013.01); *G02F 2001/133541* (2013.01); *G02F 2001/133562* (2013.01)

(58) Field of Classification Search
USPC .................................................... 349/43, 152
See application file for complete search history.

(56) References Cited

U.S. PATENT DOCUMENTS

| | | | |
|---|---|---|---|
| 6,424,397 B1 | 7/2002 | Kuo | |
| 6,452,657 B1 | 9/2002 | Suzuki et al. | |
| 7,075,610 B2 | 7/2006 | Scalora et al. | |
| 7,196,758 B2 | 3/2007 | Crawford et al. | |
| 7,319,501 B2 | 1/2008 | Takeda et al. | |
| 7,920,238 B2 | 4/2011 | Kajita et al. | |
| 8,259,279 B2 | 9/2012 | Shoraku et al. | |
| 2003/0020851 A1 | 1/2003 | Kim et al. | |
| 2003/0223021 A1 | 12/2003 | Kaneko et al. | |
| 2004/0046908 A1 | 3/2004 | Shih et al. | |
| 2004/0135944 A1 | 7/2004 | Kim | |
| 2004/0141117 A1* | 7/2004 | Tashiro | G02F 1/133553 349/113 |
| 2004/0153171 A1 | 8/2004 | Brandt et al. | |
| 2005/0179840 A1 | 8/2005 | Park et al. | |
| 2006/0001823 A1* | 1/2006 | Shih | G02F 1/133512 349/153 |
| 2006/0007372 A1* | 1/2006 | Yuuki | G02F 1/133536 349/96 |
| 2006/0181659 A1 | 8/2006 | Kawashima et al. | |
| 2007/0153171 A1 | 7/2007 | Kim et al. | |
| 2007/0171337 A1 | 7/2007 | Kim et al. | |
| 2007/0195235 A1 | 8/2007 | Chang et al. | |
| 2008/0088550 A1 | 4/2008 | Kim et al. | |
| 2008/0100565 A1* | 5/2008 | Song | G09G 3/3433 345/107 |
| 2008/0170168 A1* | 7/2008 | Jung | G02F 1/13454 349/47 |
| 2009/0128753 A1 | 5/2009 | Shi | |
| 2009/0189847 A1 | 7/2009 | Hughes et al. | |
| 2010/0053514 A1 | 3/2010 | Chuang | |
| 2010/0079698 A1 | 4/2010 | Matsumoto | H04M 1/0266 349/58 |
| 2010/0182267 A1* | 7/2010 | Lee | G06F 3/044 345/173 |
| 2010/0253605 A1* | 10/2010 | Inada | G02F 1/136286 345/55 |
| 2011/0194056 A1* | 8/2011 | Kim | G02F 1/133555 349/114 |
| 2011/0210094 A1* | 9/2011 | Gray | G01N 21/6428 216/12 |
| 2011/0304791 A1 | 12/2011 | Takahashi et al. | |
| 2013/0250202 A1 | 9/2013 | Qi et al. | |
| 2014/0085556 A1 | 3/2014 | Yin et al. | |

FOREIGN PATENT DOCUMENTS

| | | |
|---|---|---|
| JP | 2008-020772 | 1/2008 |
| JP | 2011-170134 | 9/2011 |
| KR | 10-2005-0072388 | 7/2005 |
| KR | 10-2006-0038148 | 5/2006 |
| KR | 10-2007-0072299 | 7/2007 |
| KR | 10-2007-0120672 | 12/2007 |
| TW | 200412463 | 7/2004 |

OTHER PUBLICATIONS

Invitation to Pay Additional Fees dated May 14, 2013, PCT/US2013/031076, 5 pages.
International Search Report dated Jul. 10, 2013, PCT/US2013/031076, 15 pages.

\* cited by examiner

DISPLAY WITH INVERTED THIN-FILM-TRANSISTOR LAYER

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size and weight are often important considerations in designing electronic devices. If care is not taken, displays may be bulky or may be surrounded by overly large borders.

It would therefore be desirable to be able to provide improved ways to provide displays for electronic devices.

SUMMARY

An electronic device may be provided with a display such as a liquid crystal display. The liquid crystal display may have an upper polarizer and a lower polarizer. The upper polarizer may be a circular polarizer. The upper polarizer may be formed on an upper surface of a thin-film-transistor layer. The lower polarizer may be formed on a lower surface of a color filter layer. Liquid crystal material may be interposed between the thin-film-transistor layer and the color filter layer.

The thin-film-transistor layer may have a substrate with an upper surface and a lower surface. The circular polarizer may be formed on the upper surface of the substrate. Thin-film transistor circuitry such as gate driver circuitry may be formed on the lower surface of the substrate. An integrated circuit such as a display driver circuit may be mounted on an inactive border region of the lower surface of the thin-film transistor substrate.

Display pixels may form an array on the thin-film-transistor substrate. A grid of metal gate and data lines may distribute signals from the display driver circuit and gate driver circuitry to the array of display pixels. A grid of non-reflecting material may be interposed between the grid of metal lines and the lower surface. The non-reflecting material may be an organic material or may be an inorganic material and may minimize metal line reflections visible from the top of the display.

An opaque masking layer may be formed around a peripheral portion of the thin-film-transistor substrate, overlapping a ring of sealant that is used to contain the liquid crystal material and overlapping the display driver integrated circuit.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
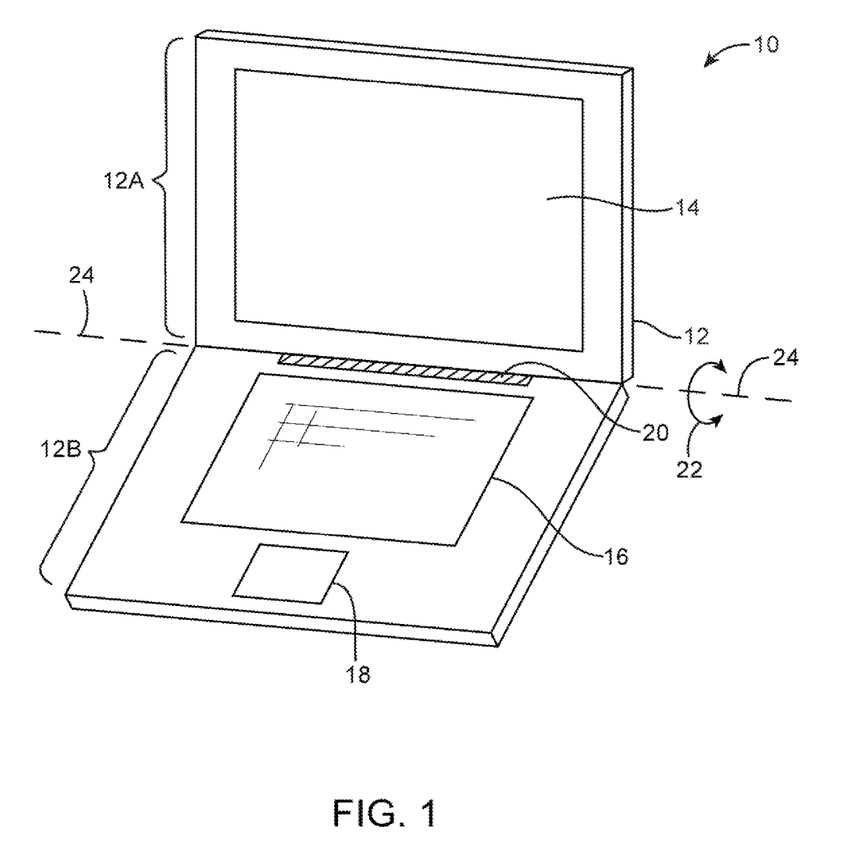
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
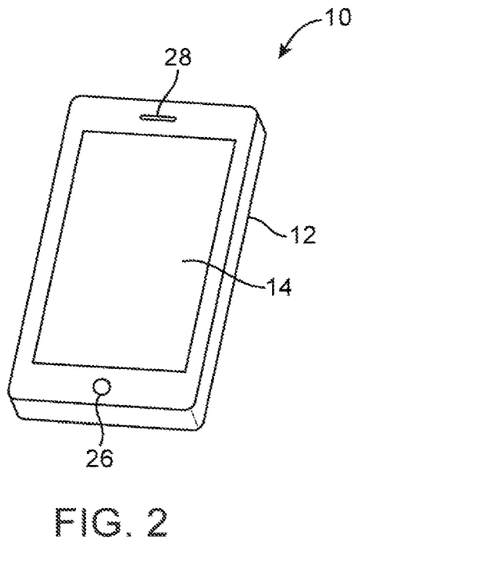
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
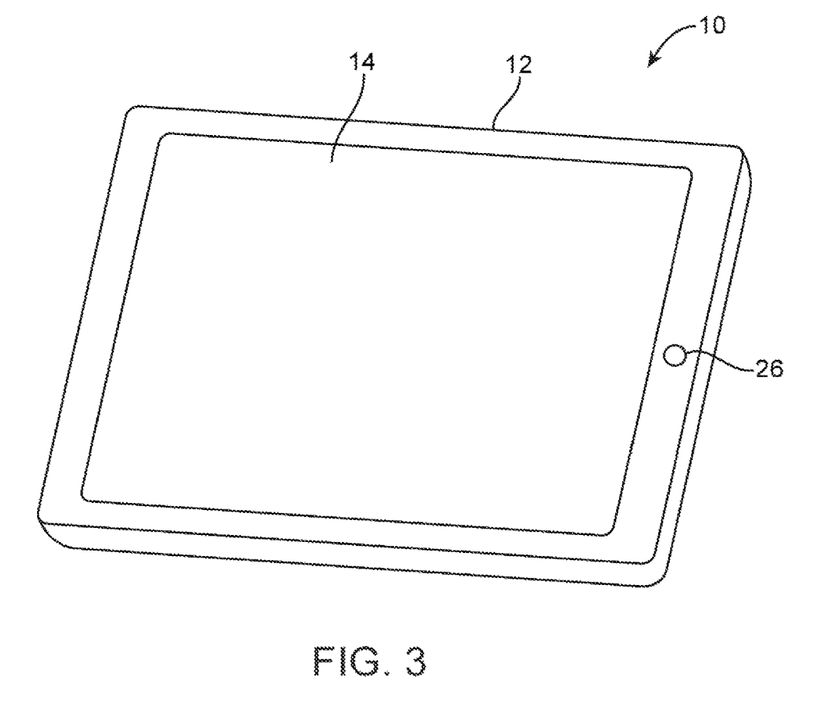
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer (e.g., a color filter layer or thin-film-transistor layer) with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer, thin-film transistor layer or other portion of a display may be used as the outermost (or nearly outermost) layer in display 14. For example, a color filter layer or thin-film transistor layer that is covered by a polarizer layer may form the outermost layer for device 10. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
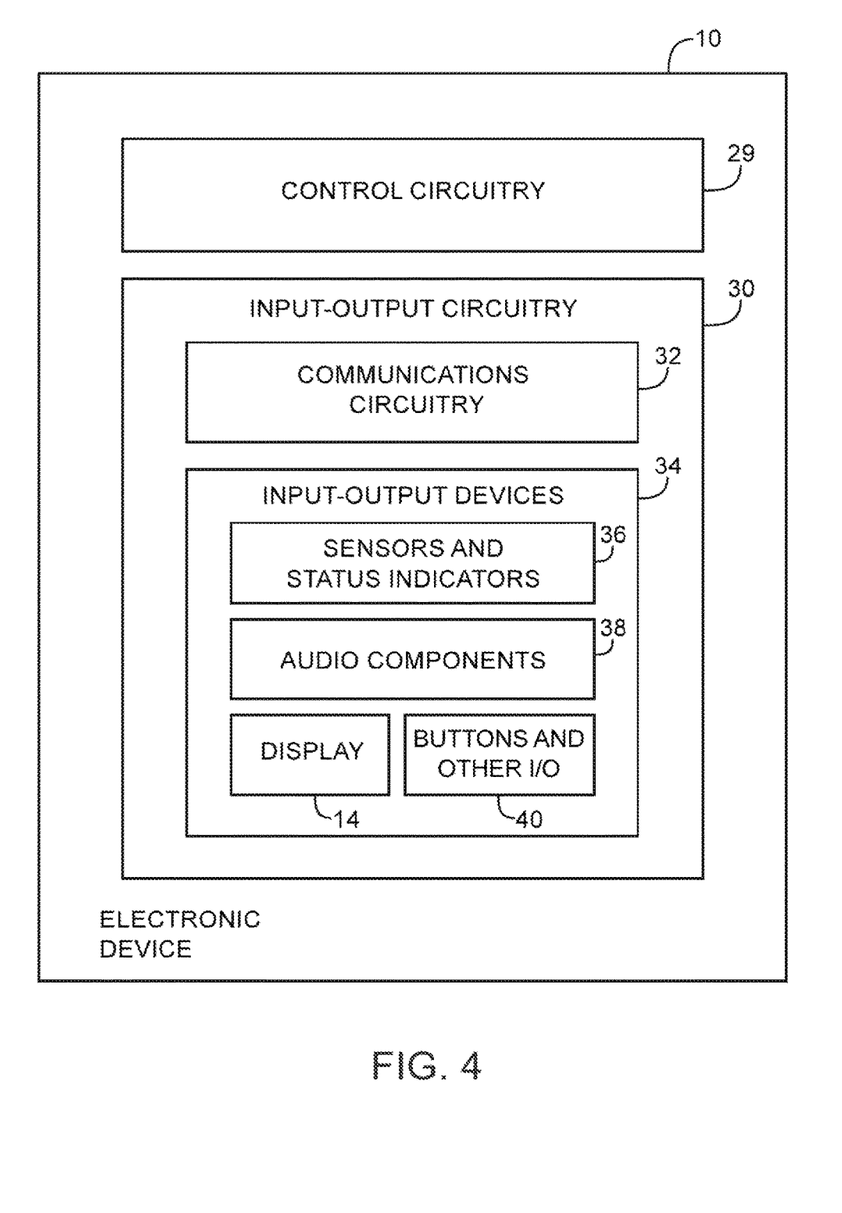
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. When presenting information to a user on display 14, sensor signals and other information may be used by control circuitry 29 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
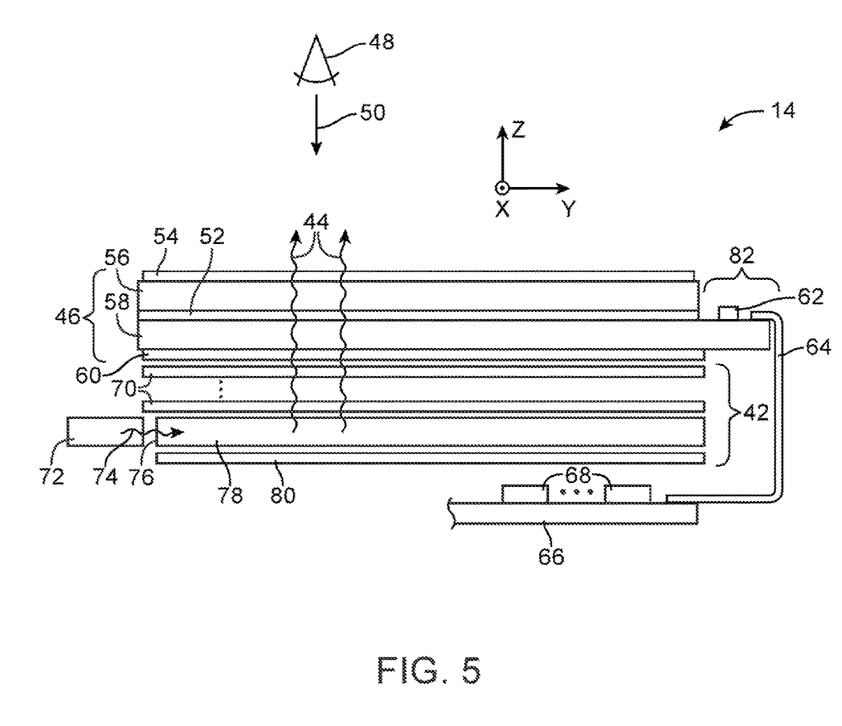
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, the positions of color filter layer 56 and thin-film-transistor layer 58 may be inverted so that the thin-film-transistor layer is located above the color filter layer.

During operation of display 14 in device 10, control circuitry 29 (e.g., one or more integrated circuits such as components 68 on printed circuit 66 of FIG. 5) may be used to generate information to be displayed on display (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 60. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
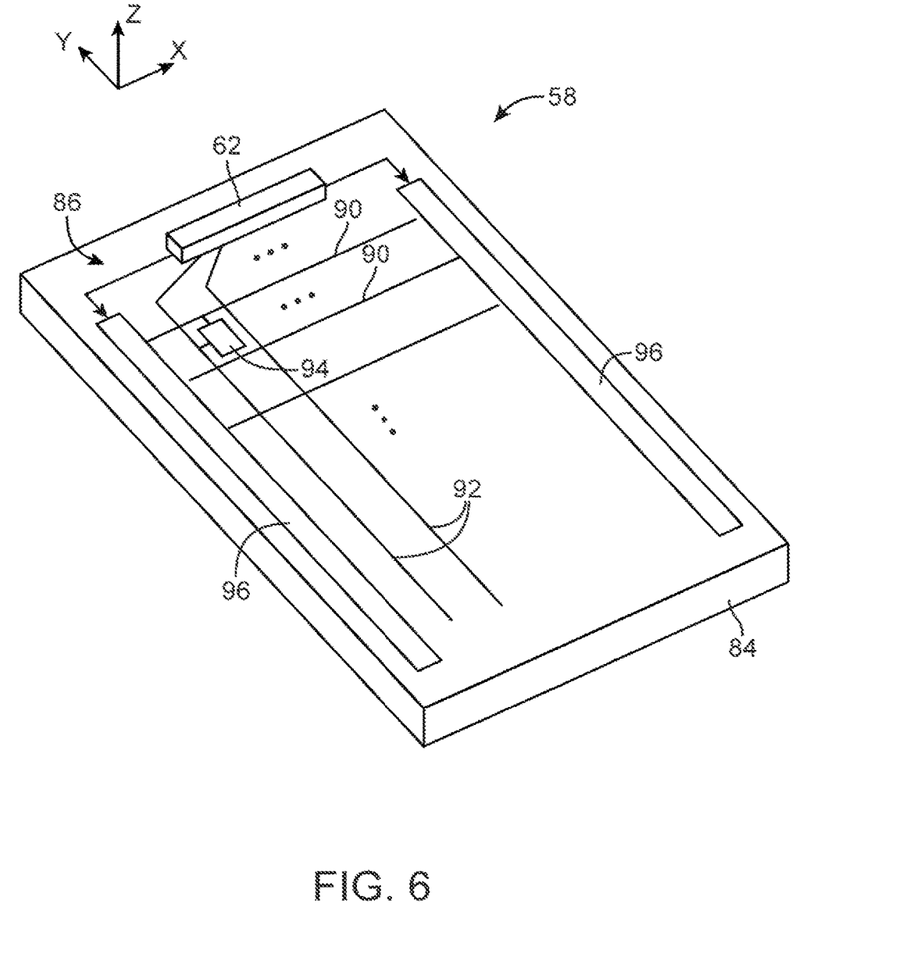
FIG. 6 is a perspective view of an illustrative thin-film transistor layer in accordance with an embodiment of the present invention.

FIG. 6 is a perspective view of an illustrative thin-film transistor layer. As shown in FIG. 6, thin-film transistor layer 58 may include a substrate such as substrate 84 and components on the surface of substrate 84 such as components 86. Substrate 84 may be formed from a clear sheet of material such as a transparent glass or plastic layer (e.g., polyimide or other polymer, etc.). Components 86 may include one or more integrated circuits such as display driver integrated circuit 62. Components 86 may also include interconnect lines and thin-film circuitry such as amorphous or polysilicon thin-film transistor circuitry.

An array of display pixels 94 may be formed in a central rectangular region on substrate 84. Each display pixel 94 may include electrodes for applying an electric field to an associated portion of liquid crystal material 52. Each display pixel 94 may also include a thin-film transistor for controlling the amount of electric field that is applied by the electrodes. Patterned traces such as lines of metal may be used in routing control signals to display pixels 94. For example, data lines 92 may be used to route data signals to the pixels 94 from display driver integrated circuit 62 (directly or through associated thin-film transistor demultiplexer circuitry on substrate 84). Gate control signals may be provided to the gates of the thin-film transistors in the display pixels 94 from gate driver circuitry 96 via gate lines 90. Gate lines 90 and data lines 92 may run perpendicular to each other to form a grid of crisscrossed metal lines on thin-film-transistor layer 58.

Gate lines 90, data lines 92, and other conductive traces on substrate 84 may be formed from metals such as aluminum, molybdenum, chromium, copper, or other metals (as examples). Transistors in gate driver circuitry 96 and display pixels 94 and other circuitry on substrate 84 may be formed from thin-film transistor structures (e.g., amorphous silicon or polysilicon transistor structures).

If desired, display 14 may be configured so that thin-film transistor layer 58 is formed on top of color filter layer 56. With this type of arrangement, which is illustrated in the cross-sectional side view of FIG. 7, thin-film transistor layer 58 lies nearer to exterior surface 104 of display 14 than color filter layer 56. Color filter layer 56 may contain an array of color filter elements 56E. Color filter elements 56E may be formed, for example, by red, blue, and green polymer elements (e.g., polyimide containing colored dyes). As backlight unit 42 produces backlight 44, the backlight passes through color filter elements 56E in color filter layer 56, thereby providing backlight 44 with color. Electrodes in the display pixels of thin-film transistor layer 58 may apply electric fields to liquid crystal material 52 so as to display images on display 14. Viewer 48 may view the images that are displayed on display 14 when viewing display 14 in direction 50.

Figure 7:
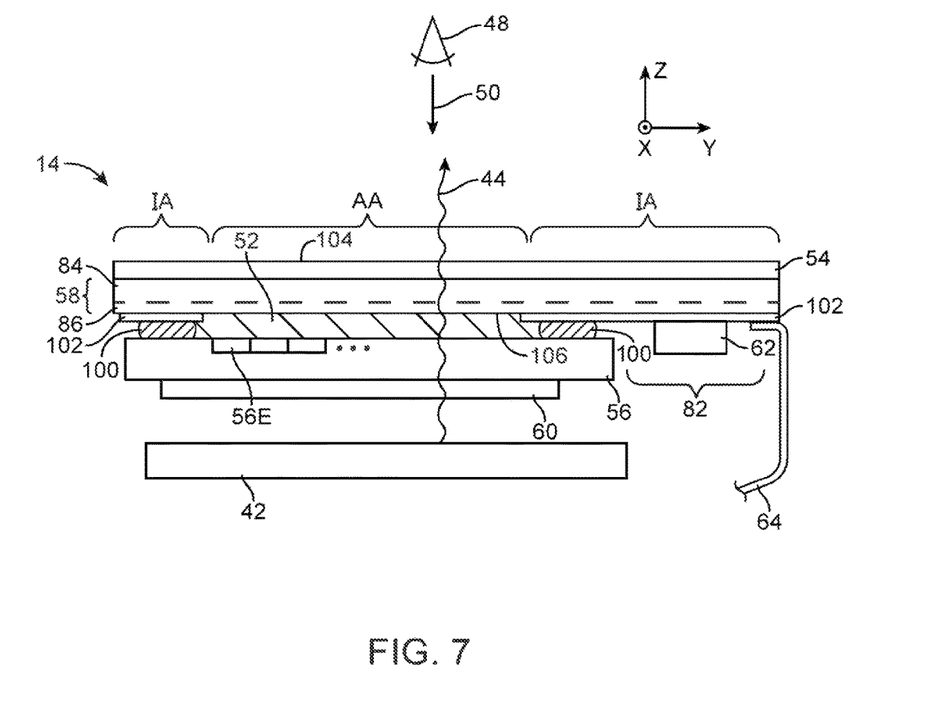
FIG. 7 is in a cross-sectional side view of an illustrative display with an inverted thin-film-transistor layer in accordance with an embodiment of the present invention.

Display driver integrated circuit 62 may be mounted on the active side (lower surface) of thin-film transistor layer 58, as shown in FIG. 7. Conductive traces associated with structures 86 on substrate 84 of thin-film transistor layer 58 may be used to convey signals between display driver integrated circuit 62 and thin-film circuitry such as display pixels 94 (FIG. 6). Flexible printed circuit 64 may be coupled to thin-film transistor layer 58 in inactive ledge region 82.

A ring of sealant such as sealant 100 may be formed in a rectangular shape that runs around the periphery of color filter layer 56. Sealant 100 may be formed from a polymer such as epoxy (as an example). Sealant 100 may be used to surround and laterally contain liquid crystal material 52 within display 14.

Active area AA of display 14 may occupy a central rectangular portion of display 14. A rectangular ring shaped inactive border region (border IA in FIG. 7) may surround the active area. Sealant 100 and display driver integrated circuit 62 may be formed in inactive region IA.

Opaque masking material 102 may be used to prevent internal components such as sealant 100, display driver integrated circuit 62, and other components on the surface of thin-film transistor layer 58 in inactive region IA from being visible from the exterior of display 14 and device 10 (e.g., to hide these components from a viewer such as viewer 48 who is viewing display 14 in direction 50). Opaque masking material 102 may be formed from an organic substance (e.g., a polymer such as polyimide containing a dye or pigment such as carbon black or other substance that renders opaque masking material opaque to visible light) or may be formed from an inorganic substance such as chromium oxide that has a black or dark color.

Figure 8:
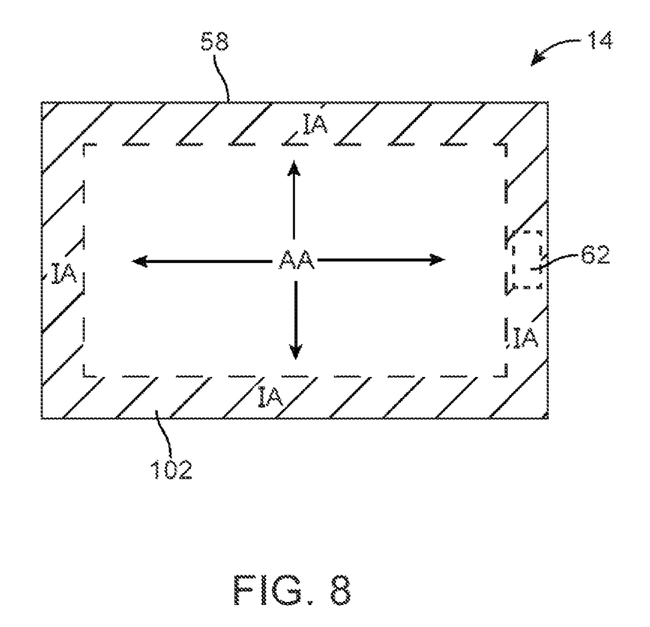
FIG. 8 is a top view of an illustrative display showing how an inactive border region may be provided with an opaque masking material in accordance with an embodiment of the present invention.

Opaque masking material 102 may be formed in strips on lower (inner) surface 106 of thin-film transistor layer 58 that run along the edges of thin-film transistor layer 58. As shown in FIG. 8, organic masking material 102 may be formed in a rectangular ring-shaped strip that surrounds the periphery of thin-film transistor layer 58 and that coincides with inactive area IA of FIG. 7. Components such as display driver integrated circuit 62 may be coupled to circuitry such as display pixels 94 using traces that run on top of opaque masking material 102 and/or that run under opaque masking material 102.

The presence of reflective structures such as metal lines 90 and 92 on thin-film transistor layer 58 may give rise to a potential for undesired reflections when layer 58 is viewed in direction 50 from the exterior of display 14. To block these metal line reflections, upper polarizer 54 may be implemented using a layer of circular polarizer material. When upper polarizer 54 is a circular polarizer, unwanted light reflections from metal structures such as traces 90 and 92 will be suppressed. To provide the exterior surface of display 14 with a smooth uninterrupted appearance, circular polarizer 54 may, if desired, extend over all or substantially all of the surface of thin-film transistor layer 58, thereby covering all of inactive area IA and overlapping sealant 100 and integrated circuit 62 (as an example).

Undesired reflections from patterned metal structures on thin-film-transistor layer 58 may also be suppressed by placing some or all of the metal structures on top of a patterned layer of non-reflecting material. The non-reflecting layer may, for example, have the shape of a grid of crisscrossed lines that matches the grid of crisscrossed metal gate and data lines used in supplying control signals from display driver integrated circuit 62 and gate driver circuitry 96 to the array of display pixels 94 in the active region of display 14. This type of configuration is shown in FIG. 9.

Figure 9:
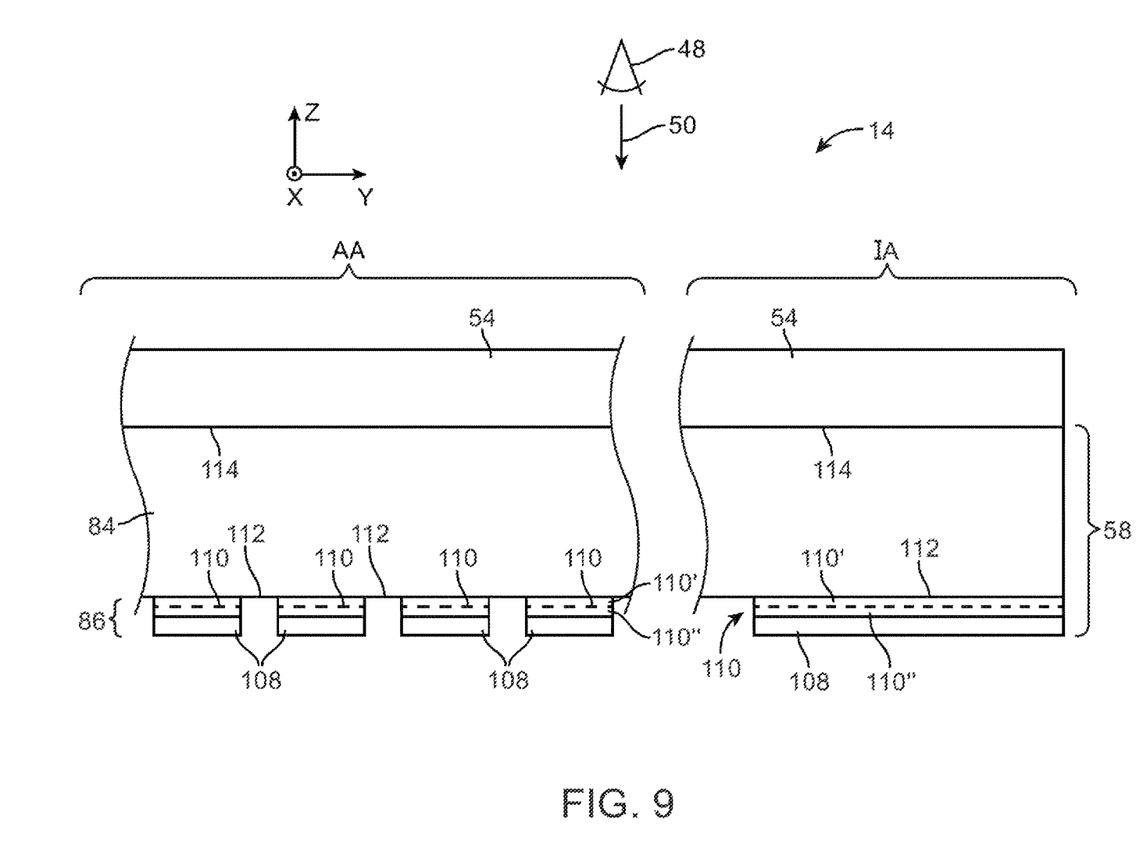
FIG. 9 is a cross-sectional side view of a thin-film transistor layer that has been provided with a patterned non-reflecting layer to help hide internal components from view in accordance with an embodiment of the present invention.

As shown in FIG. 9, thin-film transistor layer 58 may include a substrate such as substrate 84. Substrate 84 may be a layer of clear plastic, a layer of clear glass, or other transparent material. Conductive metal traces 108 such as metal lines 90 and 92 of FIG. 6 may be formed in a grid pattern on the underside (inner surface) of thin-film-transistor layer 58 (e.g., on the lower surface of substrate 84). The presence of reflections from metal traces 108 may be suppressed by interposing a matching grid of non-reflective (e.g., black) lines 110 between metal traces 108 and lower (innermost) surface 112 of substrate 84. Lines 110 may be the same width or a slightly larger width than lines 90 and 92 (as an example). Uppermost surface 114 of thin-film-transistor substrate 84 may be covered with a layer of polarizer such as polarizer 54 (e.g., a circular polarizer or other polarizer).

Non-reflecting material 110 may be formed from a material that has a visible-light reflectance of less than 20%, less than 5%, less than 2%, between 3-1%, or greater than 1% (as examples). The reflectance of non-reflecting material 110 is less than the reflectance of metal traces 108 (which may be 50% or more, or 70% or more), so the presence of non-reflecting material 110 between metal traces 108 and surface 112 of substrate layer 84 suppresses reflections and helps to decrease the visibility of metal traces 108 by a viewer such as viewer 48 who is viewing display 14 in direction 50.

Non-reflecting material layer 110 (which may sometimes be referred to as an antireflection layer or low-reflection layer) may be an organic material or an inorganic material. As an example, material 110 may be an organic material such as polyimide or other polymer that is rendered non-reflecting by incorporation of materials such as dyes or pigments (e.g., carbon black). Non-reflecting layer 110 may also be implemented as a single-layer structure such as a solid layer of chromium oxide or as a multilayer structure (e.g., a structure in which upper sublayer 110' is formed from chromium oxide and lower sublayer 110" is formed from chrome).

In active area AA, non-reflecting material 110 may be patterned in a layer that has a footprint matching that of lines 108. For example, material 110 may be patterned to form lines that are comparable in width to lines 90 and that run along lines 90 in dimension X (FIG. 6) and may be patterned to form lines that are comparable in width to lines 92 that run along lines 92 in dimension Y (FIG. 6).

Material 110 in inactive region IA may serve to block components such as display driver circuit 62 from view in direction 50, as described in connection with opaque masking layer 102 of FIG. 7 (i.e., opaque masking layer 102 may be formed from a non-reflecting material such as material 110 of FIG. 9).

Metal 108 in region IA may be patterned to form traces that distribute signals from display driver integrated circuit 62 to display components such as an array of display pixels 94 in active area AA. Traces for distributing signals between contacts that are associated with the attachment of flexible printed circuit 64 to thin-film-transistor layer 58 and display driver integrated circuits such as integrated circuit 62 may also be formed on the lower (innermost) surface of layer 110.

The foregoing is merely illustrative of the principles of this invention and various modifications can be made by those skilled in the art without departing from the scope and spirit of the invention.

What is claimed is:

1. A display having an active area surrounded by an inactive border area, comprising:
    a polarizer;
    a thin-film transistor layer that includes a thin-film-transistor substrate layer, an array of display pixels on the thin-film-transistor substrate layer, and a grid of metal data and gate lines that distribute signals to the display pixels, wherein the thin-film transistor layer further includes a non-reflecting material that is formed between the grid of metal data and gate lines and the thin-film transistor substrate layer, wherein the thin-film transistor substrate layer is interposed between the non-reflecting material and the polarizer, and wherein the non-reflecting material extends into the inactive border area to form an opaque border; and
    a liquid crystal layer, wherein the thin-film-transistor layer is interposed between the polarizer and the liquid crystal layer.

2. The display defined in claim 1 wherein the polarizer is a circular polarizer.

3. The display defined in claim 1 wherein the non-reflecting material is characterized by a reflectance of less than 20%.

4. The display defined in claim 1 wherein the non-reflecting material comprises an inorganic material.

5. The display defined in claim 4 wherein the non-reflecting material includes multiple sublayers.

6. The display defined in claim 5 wherein the non-reflecting material includes a chrome layer and a layer of chromium oxide and wherein the chromium oxide is interposed between the chrome layer and the thin-film-transistor substrate layer.

7. The display defined in claim 4 wherein the non-reflecting material comprises chromium oxide.

8. The display defined in claim 7 wherein the metal lines comprise metal lines selected from the group consisting of: aluminum lines, molybdenum lines, chromium lines, and copper lines.

9. The display defined in claim 8 wherein the polarizer is a circular polarizer.

10. The display defined in claim 8 further comprising:
    a color filter layer;
    an additional polarizer; and
    a light guide plate, wherein the color filter layer is interposed between the additional polarizer and the liquid crystal layer and wherein the additional polarizer is interposed between light guide plate and the color filter layer.

11. The display defined in claim 1 wherein the non-reflecting material comprises an organic material.

12. The display defined in claim 11 wherein the non-reflecting material is configured to exhibit a reflectance of less than 20%.

13. The display defined in claim 1 further comprising:
    a light guide plate that distributes backlight;
    a color filter layer; and
    an additional polarizer, wherein the color filter layer is interposed between the additional polarizer and the liquid crystal layer and wherein the additional polarizer is interposed between light guide plate and the color filter layer.

14. The display defined in claim 1 further comprising:
    a color filter layer, wherein the liquid crystal layer is interposed between the color filter layer and the thin-film-transistor layer;
    sealant that is formed between the color filter layer and liquid crystal layer and that surrounds the liquid crystal layer to contain the liquid crystal layer, wherein the opaque border overlaps the sealant in the inactive border area.

15. A display comprising:
    an upper polarizer;
    a lower polarizer;
    a liquid crystal layer;
    a thin-film transistor layer between the upper polarizer layer and the liquid crystal layer;
    a color filter layer between the lower polarizer and the liquid crystal layer;
    a backlight structure, wherein the lower polarizer is interposed between the color filter layer and the backlight structure;
    at least one integrated circuit mounted to the thin-film transistor layer, wherein the thin-film transistor layer comprises:
        a thin-film-transistor substrate layer;
        gate driver circuitry on the thin-film transistor substrate layer;
        display pixels on the thin-film transistor substrate layer;
        a grid of crisscrossed metal gate and data lines on the thin-film transistor substrate layer that distribute signals to the display pixels from the gate driver circuitry and the integrated circuit;
        a grid of crisscrossed lines of non-reflecting material interposed between the grid of crisscrossed metal gate and data lines and the thin-film transistor substrate layer, wherein the grid of non-reflecting material extends into an inactive region of the display to form an opaque border in the inactive region of the display, and wherein the opaque border overlaps the at least one integrated circuit to hide the at least one integrated circuit from view.

16. The display defined in claim 15, comprising:
    sealant that surrounds the liquid crystal layer and that is interposed between the thin-film transistor layer and the color filter layer, wherein the opaque border overlaps the sealant to hide the sealant from view.

17. The display defined in claim 16 wherein the upper polarizer comprises a circular polarizer.

18. The display defined in claim 17 wherein the grid of crisscrossed lines of non-reflecting material comprises an inorganic material.

19. The display defined in claim 18 wherein the inorganic material is configured to exhibit a visible light reflectance of less than 20%.

20. The display defined in claim 19 wherein the inorganic material comprises chromium oxide.

21. The display defined in claim 17 wherein the grid of crisscrossed lines of non-reflecting material comprises polymer.

22. A display, comprising:
    a thin-film transistor layer having a substrate with opposing first and second surfaces, having a grid of non-reflecting lines on the second surface, and having metal gate and data lines on the grid of non-reflecting lines;
    a circular polarizer on the first surface;
    a color filter layer;
    a liquid crystal layer between the thin-film transistor layer and the color filter layer; and
    an opaque masking layer interposed between the substrate and the metal gate and data lines in an inactive border region of the display, wherein the metal gate and data lines are interposed between the liquid crystal layer and the second surface of the substrate.

23. The display defined in claim 22 wherein the grid of non-reflecting lines comprises chromium oxide.

24. The display defined in claim 23 wherein the grid of non-reflecting lines comprises first and second inorganic sublayers.

25. The display defined in claim 22 further comprising:
an integrated circuit on the opaque masking layer, wherein a portion of the circular polarizer overlaps the opaque masking layer, and wherein the opaque masking layer is formed on the second surface of the substrate.

* * * * *